1482X
J. Boynton,
Card-Grinding Machine.
Patented Mar. 30, 1811.
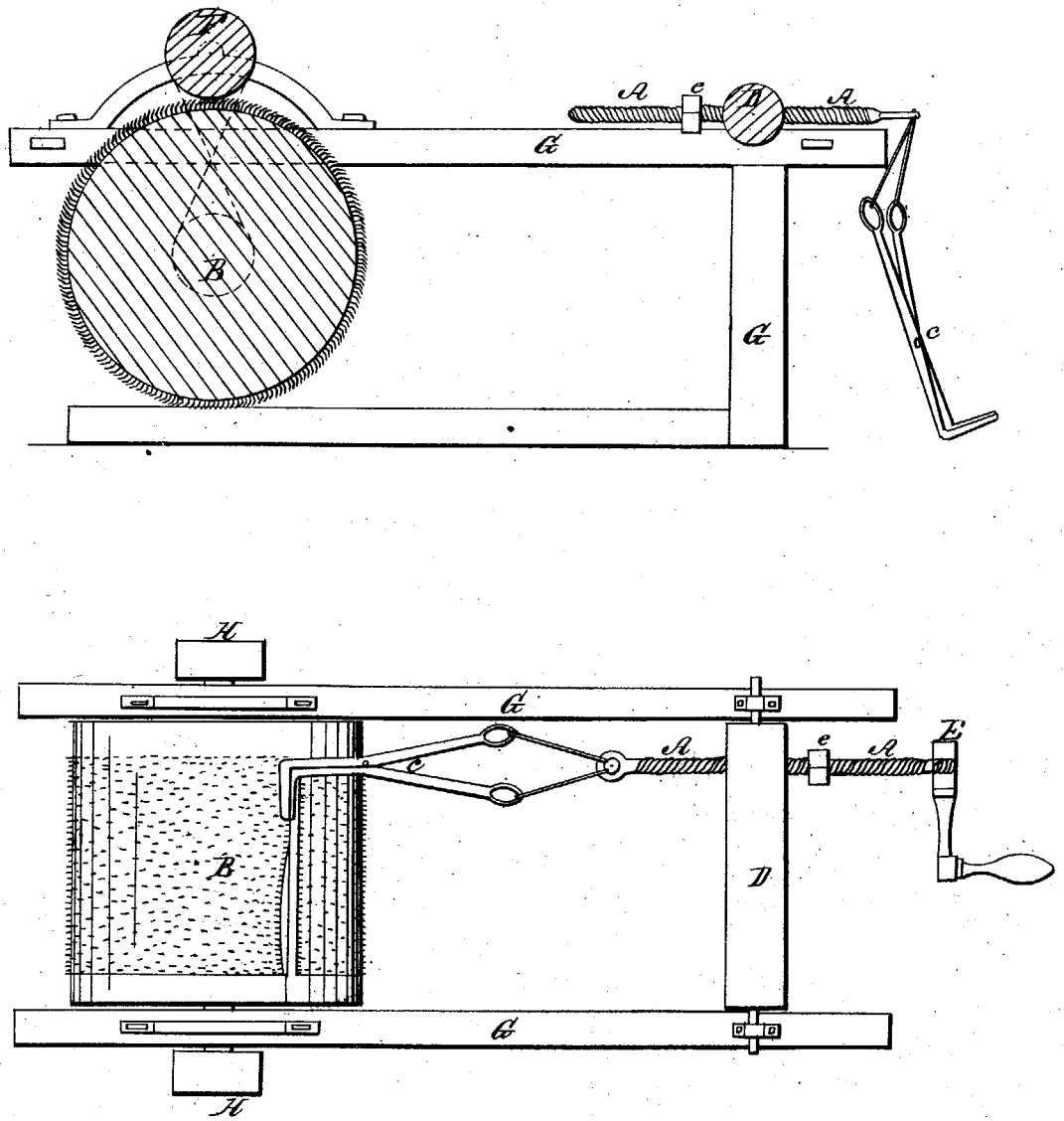
N. PETERS, PHOTO-LITHOGRAPHER, WASHINGTON, D. C.

John Boynton
Letters Patent

1482X

The Schedule referred to in these Letters Patent and making
part of the same containing a description in the words of the said
John Boynton himself of his improvement in machinery for
straining and grinding cards. The principle difference
between this and other machinery for straining and grinding
Cards which the subscriber claims as original proprietor or
inventor of: is in the operation of the screw 2) cylinder to strain
and grind cards with. 1st The nippers or pinchers are made
of iron or steel of about the length and size as commonly used
to strain cards by hand and principally in the same form ex-
cept the fore part which has one turn more than those used by
hand. to save the cards first nailed on to a cylinder from
damage when straining and nailing on the last.
The hinder part of the nippers are by hooks or links connect-
ed to a screw which goes (through a mortise made of equal
length of the cards to be strained) through a cylinder or beam which
is fastened at each end in a setting position or as to the frame
in which the cylinders are placed to be clothed with cards. A
crank or nut with a screw cut in it is turned on to the screw
on the side of the beam opposite to the nippers which take hold
of the card; and the crank or nut may be turned more or
less at pleasure 3d The cylinder for grinding cards is nine
inches in diameter but may be smaller or larger and is
about six inches longer than the cylinder on which the
cards are to be ground in order to receive bands on both
ends of it to give motion to that and other cylinders having
cards on them to be ground. 4th This cylinder is to be covered
on or clothed with a coat of coarse emery and placed on the
machine in such position as when in motion will operate
lately on the points of the card teeth which are also in motion.
5th &c. The covering cylinder for setting is motioned by a band from the
spur or large wheel on the end of the main cylinder and may
be varied to other velocity at pleasure. He is believed that this
method of straining cards with a screw & grinding them with
a cylinder differs from any other method heretofore used or inven-
ted.

Witnesses — Silas Boynton

Jeremiah Parish

Uriah [illegible]

[illegible]

[illegible] Cards [illegible] [illegible] [illegible]

1482X